(12) United States Patent
Karamchetty et al.

(10) Patent No.: US 7,010,647 B1
(45) Date of Patent: Mar. 7, 2006

(54) COMPUTER SYSTEM WITH REMOVABLE DATA STORAGE DEVICE AND METHOD

(75) Inventors: Somayajulu D. Karamchetty, Columbia, MD (US); Alan E. Barrick, Mount Airy, MD (US); James Gantt, Duluth, GA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 373 days.

(21) Appl. No.: 10/318,666

(22) Filed: Dec. 13, 2002

(51) Int. Cl.
*G06F 12/14* (2006.01)

(52) U.S. Cl. .................. 711/115; 711/102; 711/103; 711/104; 711/163; 711/164

(58) Field of Classification Search ........ 711/102–104, 711/115, 163, 164; 713/182–186
See application file for complete search history.

(56) References Cited

U.S. PATENT DOCUMENTS

| | | | | |
|---|---|---|---|---|
| 4,141,078 A | | 2/1979 | Bridges, Jr. et al. | |
| 5,153,918 A | * | 10/1992 | Tuai | 713/182 |
| 5,319,711 A | * | 6/1994 | Servi | 380/247 |
| 5,339,073 A | * | 8/1994 | Dodd et al. | 340/5.61 |
| 5,455,409 A | | 10/1995 | Smith et al. | |
| 5,629,981 A | * | 5/1997 | Nerlikar | 713/168 |
| 5,933,395 A | | 8/1999 | Dang et al. | |

FOREIGN PATENT DOCUMENTS

JP 05189795 7/1993

* cited by examiner

*Primary Examiner*—T Nguyen
(74) *Attorney, Agent, or Firm*—William Randolph

(57) ABSTRACT

A computer system and method for securely storing data are provided. A Radio Frequency Identification Device (RFID) tag is applied to a removable data storage device that is able to be inserted and removed from the computer system. An identification code is assigned to respective removable data storage devices in which the identification code and other information associated with the removable data storage devices are stored at the computer system upon insertion and retrieval of the removable data storage devices to and from the computer system.

14 Claims, 12 Drawing Sheets

DEPOSIT MEDIA INTO STORAGE

RETRIEVE MEDIA FROM STORAGE

Directory Information
*Disk: ID # 123 456 7890*

| File | Created | Deleted | Modified Checked out size | Modified Checked in size | Checked out Name | Checked out Date & Time | Checked in Name | Checked in Date & Time | Notes |
|---|---|---|---|---|---|---|---|---|---|
| Visitors.acs | NA | NA | 23456 | 23798 | John Kite | 19990102:1 2:34:45 | John Kite | 19990102:1 4:56:24 | None |
| | | | | | | | | | |

*FIG. 10*

COMPUTER SYSTEM WITH REMOVABLE DATA STORAGE DEVICE AND METHOD

STATEMENT OF GOVERNMENT INTEREST

The invention described herein may be manufactured, used and/or licensed by or for the Government of the United States of America.

BACKGROUND OF THE INVENTION

1. Field of the Invention

The present invention relates to computer storage media systems and methods and more particularly to such systems and methods employing removable media devices.

2. Description of Related Art

Computer storage media devices such as floppy disks, hard disk drives, removable hard disks, compact disks (CD), digital versatile disks (DVD), tape drives, smart cards, and PCMCIA cards are employed in many computer systems. Security of these types of storage media typically involves only manual processes. Usually, several individuals in an office have access to a secure storage area where media are checked in and out. The disadvantages of such a system are many. By using only manual devices, it is very cumbersome to track a list of borrowers of media devices from a storage area. Full scale accounting of monitored items is extremely slow. It is even more onerous to account for the duration of time that individuals had these media in their possession. The combination of slow accounting of information and high speed copying and transmission of computer information allows miscreants to copy or steal the information on the storage devices and then replace the computer information storage devices in the storage rooms. The periodic nature of current record keeping systems allows miscreants to tamper with the storage devices. A manual system often does not accurately inventory nor track computer media and the accountability of media users.

Security problems can be traced to the tremendous progress made in the capacity of storage media and devices, and the information transfer rates. Early floppy disks and tape drives of the nineteen seventies were capable of storing several hundred kilobytes of information while the floppy disks of the nineteen nineties have capacities of the order of 1.4 megabytes. Current Zip drives store several hundred megabytes of information while they measure about 3.5 inches by 4 inches and are a quarter inch thick, and certain thinly dimensioned drives and carry several gigabytes of information. A decade ago only a very select group of users had access to write-capable CD-ROM drives, however most current computer systems now have capabilities to write CD-ROMs. Recent developments have provided new recording technology that could push the maximum data capacity of a single hard disk drive platter to 200 GB.

With such advancements, almost any computer user can copy nearly a terabyte of information; it can be done in less than ten seconds. In a terabyte of information, an organization can lose all its password files, a whole set of drawings for critical weapon systems, complete specification manuals, and so on. The trend in storage technology is towards greater capacities, smaller sizes, and faster speeds of transfer of information. Credit card size storage devices (smart cards) with megabytes of information capacity pose a real threat to information security.

Information resources further face virus attacks and other threats. Protection of information resources is crucial to national security and U.S. critical infrastructure protection groups are addressing these issues very seriously. This problem is the reverse of information stealing. As workers borrow data storage devices from an organization and use them on other computer systems and in the process introduce viruses and applets on to the data storage devices, which are in turn, transmitted to host computers upon return to the organization. Once introduced, applets, software agents, and other computer programs can cause an organization's critical computer information to be transmitted via a network without a user's knowledge. Compared to fixed data storage devices (hard disk drives), removable data storage devices allow users to transfer information (data and programs) from one computer to another in one organization and from one computer to another in different organizations. Organizations do not want unauthorized information introduced inadvertently, deliberately, or maliciously into their systems.

Certain media storage containers available today offer barcode recognition of interchanged drives and magazines. As an example, The Kodak Digital Science CD/DVD Library is a CD jukebox designed for high-volume information storage, retrieval, archiving, and backup applications. The CD/DVD library can give one access to a total of 162 CDs or DVDs, providing a maximum storage capacity of 421 gigabytes of data. An average disc exchange time of about four seconds helps assure that information is available immediately when users request it. The arrangement is a front-loading mailbox with password security key-lock and software-interlock front door access to drive and magazine bay support for "hot-swaps" of magazines. The library device has bar code recognition of interchanged drives.

Systems such as these have several disadvantages: 1) they are always on line, 2) they do not record who accessed which device, and 3) they do not record what (copy, modify, delete) users did with those files or information. Additionally, paper barcodes suffer from the disadvantage that it is relatively easy for miscreants and adversaries to forge them. Many large storage systems have been developed in response to the explosive growth in network storage capacity requirements. They are attractive for adding storage quickly and economically. Despite their advantages, these online information storage devices are not detached storage devices, which are a requirement in the case of highly valuable and national security critical information. With lap top computers, PDAs, and other portable computing devices becoming smaller in size and more capable in memory size, theft of critical information from organizations is a real possibility. Techniques and methods are needed to safeguard information of an organization by using such portable devices as physical conveyors of computer information.

Personal computers purchased by the Defense Department since 1994 have been equipped with PCMCIA card slots, as part of a secure Defense Message System. The cards, which can hold 170 megabytes of information, can fit into a shirt pocket, so a job begun at one workstation might be continued at another location on a different computer. While this feature is an advantage for genuine workers, it is also a feature welcomed by thieves, malicious users, and agents of adversaries.

SUMMARY OF THE INVENTION

A method of securely storing data in a computer system is provided which comprises providing a removable data storage device that is able to be inserted and removed from the computer system and the step of applying a Radio Frequency Identification Device (RFID) tag to the removable data storage device is performed.

A computer system for securely storing data is provided having a removable data storage device that is able to be inserted into and removed from the computer system and a Radio Frequency Identification Device (RFID) tag applied to the removable data storage device is provided.

BRIEF DESCRIPTION OF THE DRAWING

FIG. 10 is illustrative of an example log of information associated with a removable data storage device.

DETAILED DESCRIPTION

Figure 1:
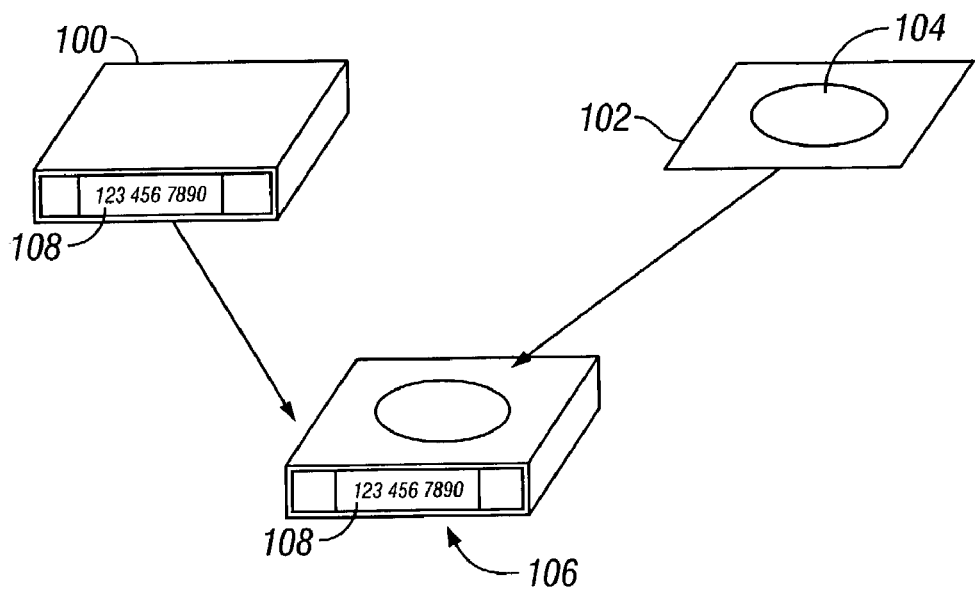
FIG. 1 is illustrative of a removable data storage device with identification tag.

As will be shown and described herein, a computer system for securely storing data is provided. A removable data storage device that is insertable into and removable from the computer system is affixed with an identification tag, such as a Radio Frequency Identification Device (RFID) tag. Referring to FIG. 1, a removable data storage device 100 is shown. A label 102 mounted to an associated RFID tag 104 are together placed on the removable data storage device 100 resulting in the combination 106 as shown. The label and tag combination does not add much thickness, bulk, or weight to the disk. In the example shown in FIG. 1, various removable data storage devices may be employed, including but not limited to: floppy disks, zip disks, digital versatile disks (DVD's), tape drives, smart cards (including Common Access Cards by the Department of Defense), or PCMCIA (personal computer memory card international association) cards. An identification code (such as an identification number or other code) is assigned to a respective removable data storage device 100. As will be described in further detail, the RFID tag 104 has read/write capabilities. In one example, the RFID tag 104 has a silicon integrated circuit connected to carbon ink electrodes such that a storage unit to hold identification information is provided at the RFID tag 104. The identification code 108 associated with the removable data storage device 100 is stored at the RFID tag 104 attached to the storage device. Several types of RFID tags are currently available that can be applied to the data storage devices. It is also possible that the RFID devices can be deposited on to the data storage devices during manufacturing stage.

Figure 2:
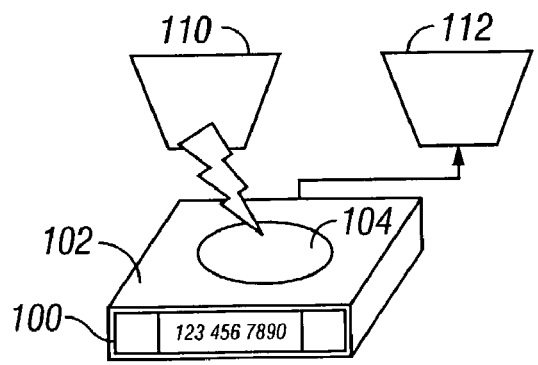
FIG. 2 is illustrative of readers used for reading the removable data storage device.

FIG. 2 shows two readers 110, 112 operating in combination with the tagged removable data storage devices 100. FIG. 2 shows an identification tag reader 110 that, in combination with the computer system, reads the identification code when the removable data storage device 100 is inserted into the computer system. A media reader 112 is provided that reads directory data from the removable data storage device 100 when the device is inserted into and removed from the computer system. The tag may selectively be a Radio Frequency Identification Device, and an RFID reader is employed. It is a non-contact reader and the tag 104 can be read at an appreciable distance. Media reader 112 (such a disk reader) is capable of reading the magnetic or optically stored data on the removable data storage device 100.

Figure 3:
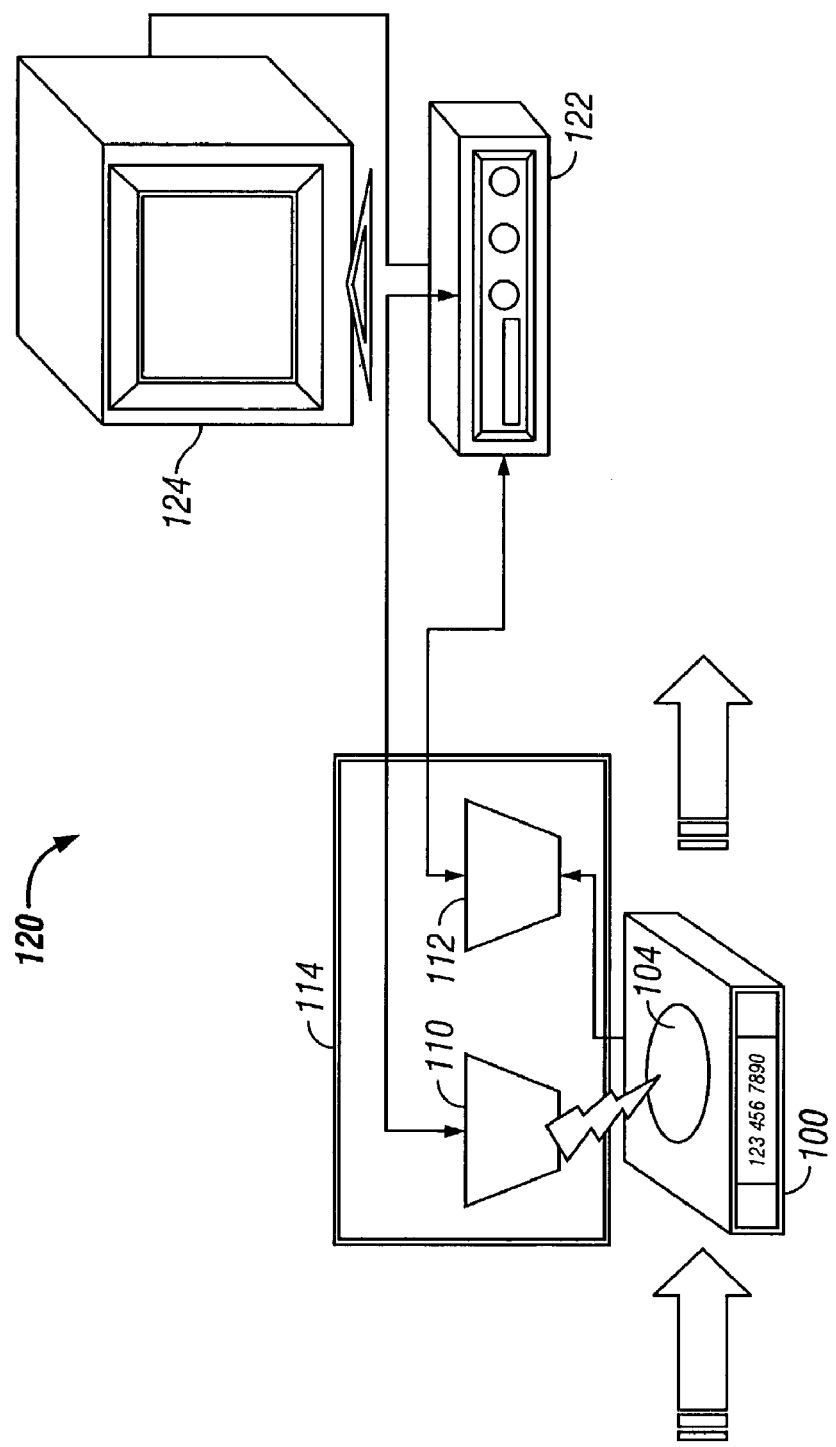
FIG. 3 is illustrative of a computer system for reading and storing data from removable data storage devices.

As a data storage device moves across the twin readers 110 and 112, located in reading unit 114, as shown in FIG. 3, information is transferred from the removable data storage device 100. Tag reader 110 captures the data storage device identification code, and the media reader 112 captures the directory information. As seen in FIG. 3, reading unit 114 of computer system 120 houses identification tag reader 110 and media reader 112 which are both coupled to processing device 122 (such as a central processing unit) that is coupled with monitor 124 for display of information. The identification tag reader 110 and media reader 112 transmit the identification code from the RFID tag 104 and the data directory from the removable data storage device 100 to the processing device 122 upon being read by the readers 110, 112. The processing device 122 drives the readers and stores the identification information and data directory information on the removable data storage device 100. Monitor 124 is used in conjunction with the CPU 122. In this example, various types of computer systems may be employed such as a personal computer, desktop, laptop etc. computer system operated by the user or for example, a computer system which controls and monitors the access to multiple stored data storage devices as seen in FIGS. 4–6.

Figure 4:
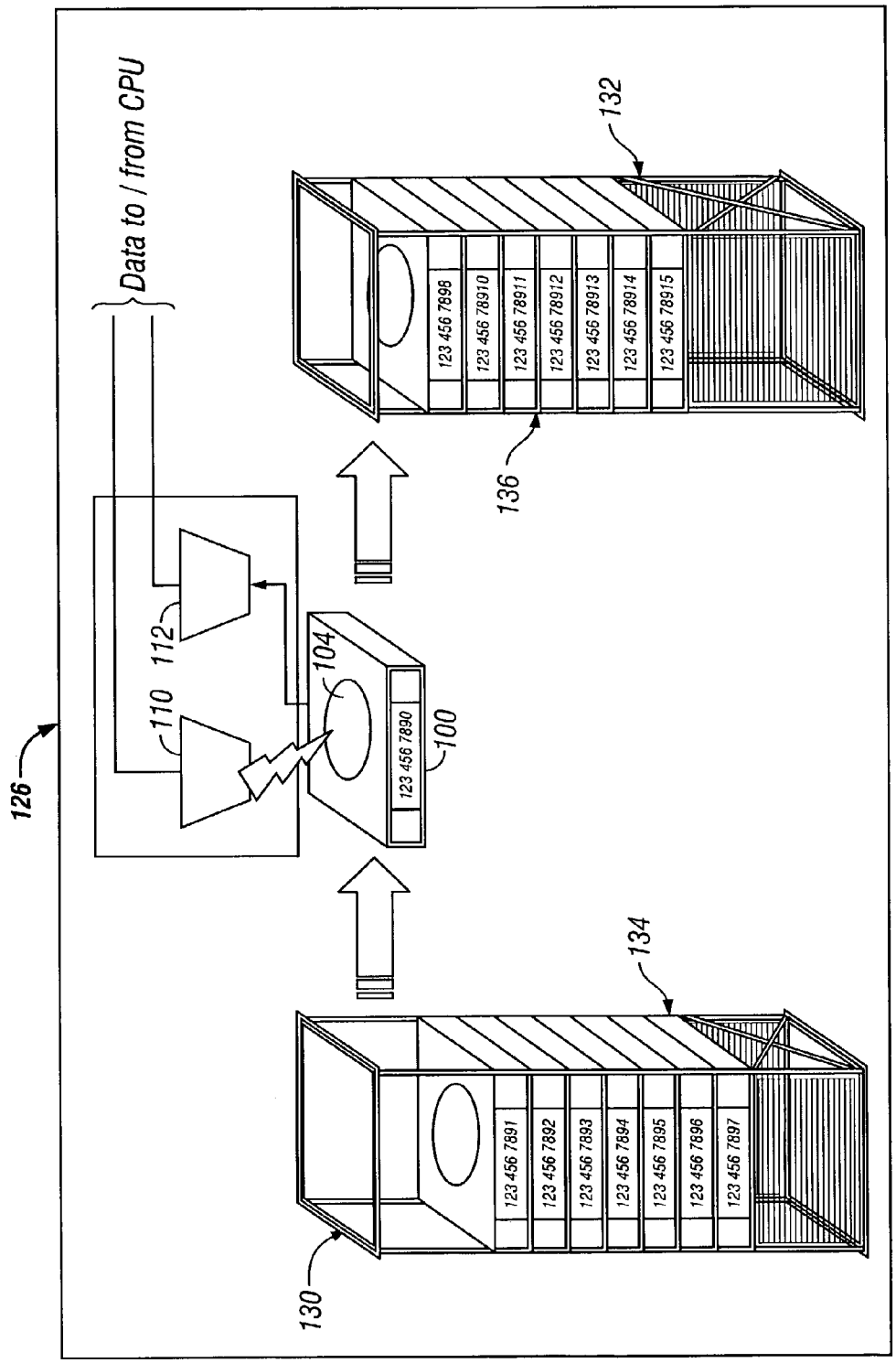
FIG. 4 is illustrative of a storage system for storage operation at the computer system.

Storage system 126 is depicted in FIG. 4. In one example, it is a sealed box (safety container) comprising a first storage device holder such as an incoming/outgoing disk carousel (incoming/outgoing rack) 130, and a second storage device holder such as a storage carousel, (storage rack) 132. Storage device holder 130 provides a stack 134 of incoming removable data storage devices that a user is submitting to the storage system 126 for safe and secure keeping. Storage device holder 132 provides a storage stack 136, which receives and keeps the data storage devices 100 transported from the incoming stack 134 to the storage stack 136. As each data storage device 100 traverses the path from the input/output location (incoming side) to the storage location (storage side), the twin readers 110, 112 read the information on the identification tag 104 and the data storage device (such as a computer disk). Generally, only the directory information on the disk is read. In one example, the readers 110, 112 are prevented from accessing and reading the content information on the removable data storage device 100. Another feature of the system is that if there is no identification tag on the removable data storage device 100, that device 100 will not be accepted for storage. Also, neither the contents of the data storage devices nor the directory information contained therein will be read if the tag is not validated. Such prevention of reading of data storage devices, which are not validated by a proper tag, protects a computer system from accepting viruses, Trojan horse software, or other malicious software agents. In other words, only authorized storage devices (disks) 100 are accepted for use or storage. The access to the storage system 126 of the computer system 120 is through the incoming disk stack 134. A user can feed one data storage device 100 at a time into the system. Several disks can be fed one after the other. The system 120 will log them, or catalog them and move them from the incoming rack 130 to the storage rack 132.

Figure 5:
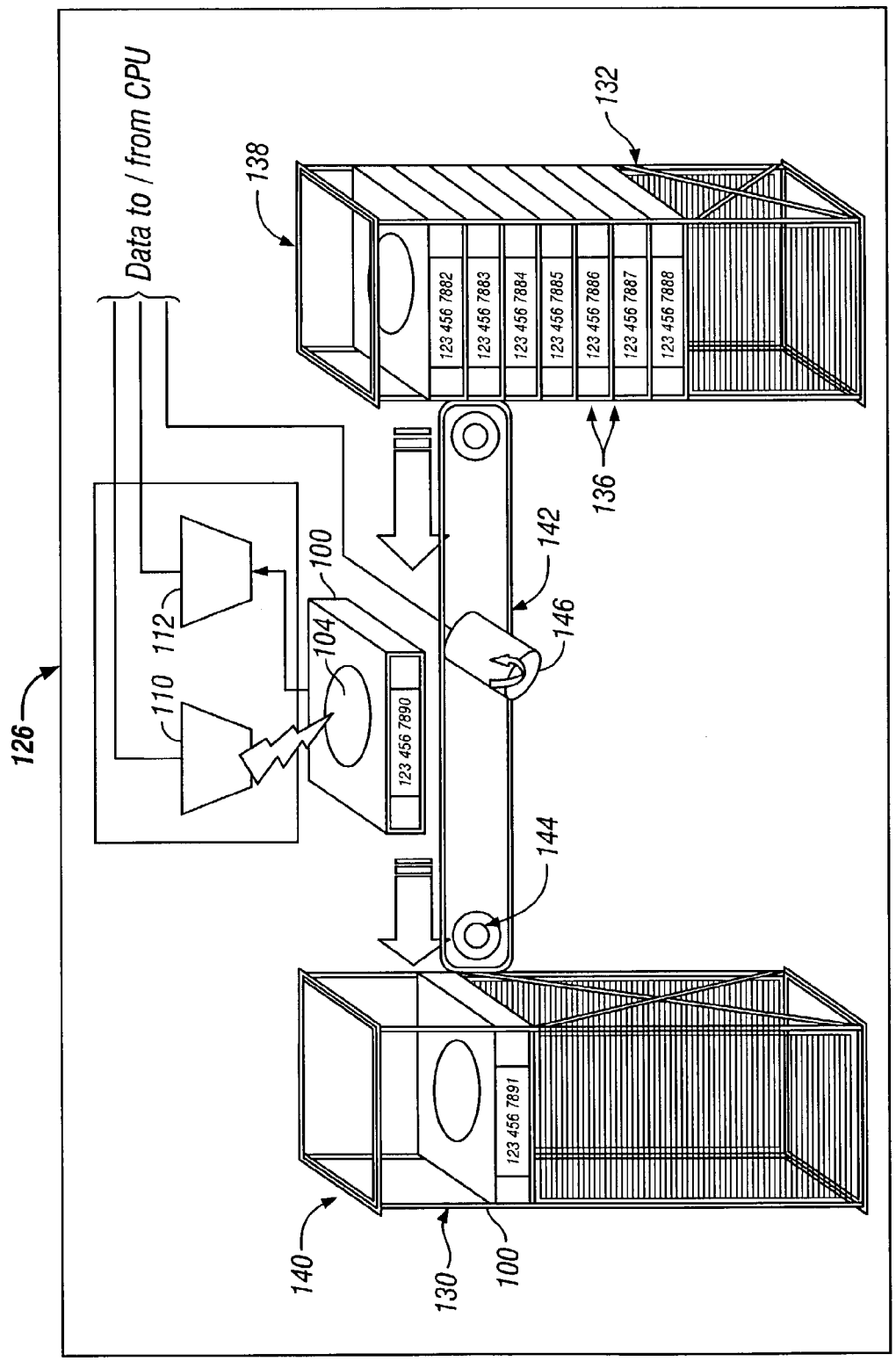
FIG. 5 is illustrative of the storage system for retrieval operation of removable data storage devices.
Figure 6:
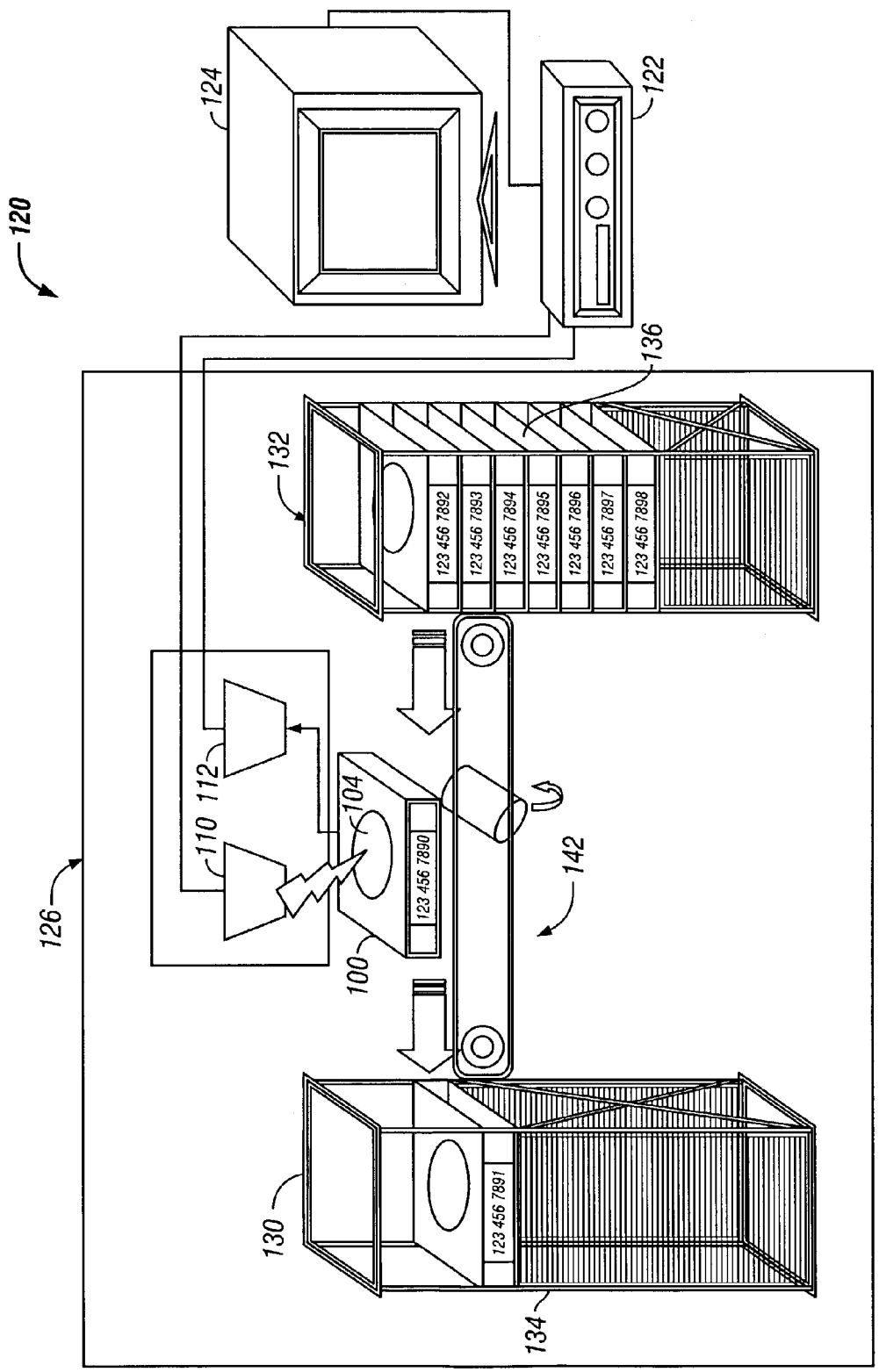
FIG. 6 is illustrative of the computer system for recording data associated with removable data storage devices.

FIG. 5 shows a data storage device retrieval operation. In this example, the direction of the data storage device (disk) traversal is shown reversed here from that in FIG. 4. As seen in FIG. 5, a removable data storage device 100 (such as a computer disk) is retrieved from the storage location having many stored data storage devices (at storage rack 132) in response to an authorized user request identifying the particular identification code for the removable data storage device 100. The removable data storage device 100 is transferred from the storage location 138 to an output location 140 (at incoming and outgoing rack 130) of the computer system. The identification code at tag 104 is read by the identification tag reader 110 and directory data is read from the removable data storage device 100 by media reader 112 during transfer of the removable data storage device 100.

Transportation device 142 transfers removable data storage devices 100 between storage device holder 132 and storage device holder 130 (and vice versa) such that the identification tag reader 110 reads the identification code and the media reader 112 reads the directory data during transfer of the removable data storage device 100 between storage device holder 132 and storage device holder 130. In the example of FIG. 5, a conveyor 144 and drive 146 are used as a transportation device, however any suitable transportation means to move the data storage devices 100 between the storage location and the input/output location may be employed.

In particular, a disk (or storage data device) is released by means of a disk storage and disk traversal motor 146 and conveyor 144 coupled with and operating under control of the processing device 122. An authorized user inputs user identification information to the processing device (CPU) and enters the identification code of the desired disk to be retrieved. The computer controlled rack 132 positions itself so that the requested disk is at the traversal point. The disk 100 is then conveyed to the outgoing stack 134. The CPU 122 records the name of the requester and the disk 100 requested. The CPU 122 also records the directory details on that disk 100, which should be the same as they were when the disk was received into storage. Unauthorized users cannot access the computer system 120 even if they get physical access to the system, assuming they cannot break open the storage container 126.

Figure 7:
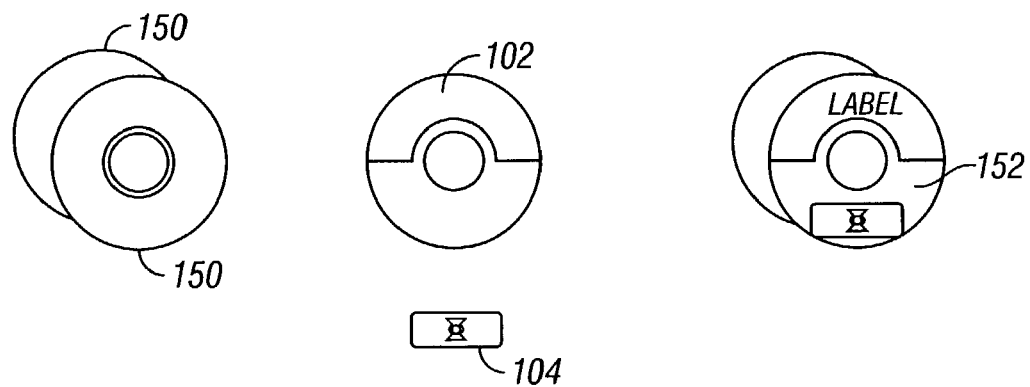
FIG. 7 is illustrative of a removable CD-ROM.

FIG. 6 illustrates the computer system 120 with the storage system 126 and the controlling computer processing device 122. In this example, computer system 120 performs monitoring functions and watches the store of data storage devices and the storage system. One method of identifying the removable data storage devices 100 consists of using a radio frequency identification device (RFID) technology, or "smart tag" having a read/write capability incorporated within the media storage container 100. RFID technology is a form of Automatic Identification Technology (AIT) that permits rapid and accurate capture, retrieval, and transmission of information. FIG. 7 shows a CD-ROM 150 as an example removable data storage device, a paper label 102, an ID tag 104, and a combined (i.e. tagged) CD-ROM 152. The placement of a read/write smart tag 104 with a label 102 is performed on removable data storage devices to be stored in the computer system 120. The identification number of the media (removable data storage device) is stored on the attached smart tag. This is the reference number (or identification code) for the storage system when it handles media in and out.

Figure 8:
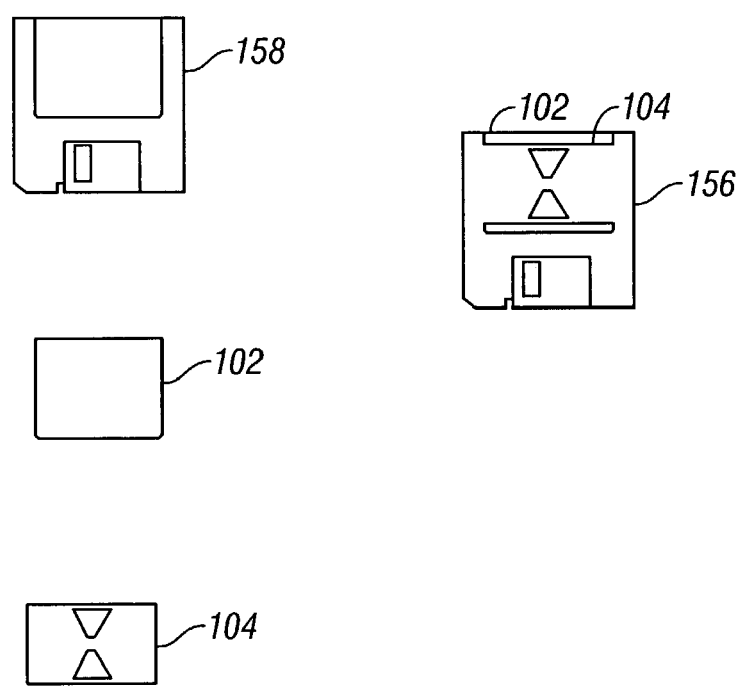
FIG. 8 is illustrative of a removable computer disk.

FIG. 8 shows an example of a tagged disk 156, with its components, namely, a bare disk 158, a label 102, and a tag 104. A removable data storage device is passed past the readers 110, 112 in the storage system 126 (as seen in FIG. 6), the id code of the disk is stored in the processing device 122. An authorized user requests for a specific disk via a computer system interface by typing a disk id. The computer system 120 will bring the disk up on the storage stack 136, convey it to the output or retrieval stack 134, and in the process read its identification code and directory data again. The user can then pick up the removable data storage device 100 and be responsible for it until its return.

When the user returns the data storage device 100 to the storage system 126, the data storage device is read, the particular storage device identified, the directory information gathered, and stored in the CPU 122. Thus, data on the removable data storage device 100 is read to identify the data storage device. Directory information pertaining to the data storage device 100 is gathered by media reader 112 for transmission and storage at the processing device 122 in response to the removable data storage device being returned to the computer system 120. As the reader records date and time of data storage device 100 deposits and retrievals, accountability of data storage device usage is maintained.

Figure 9:
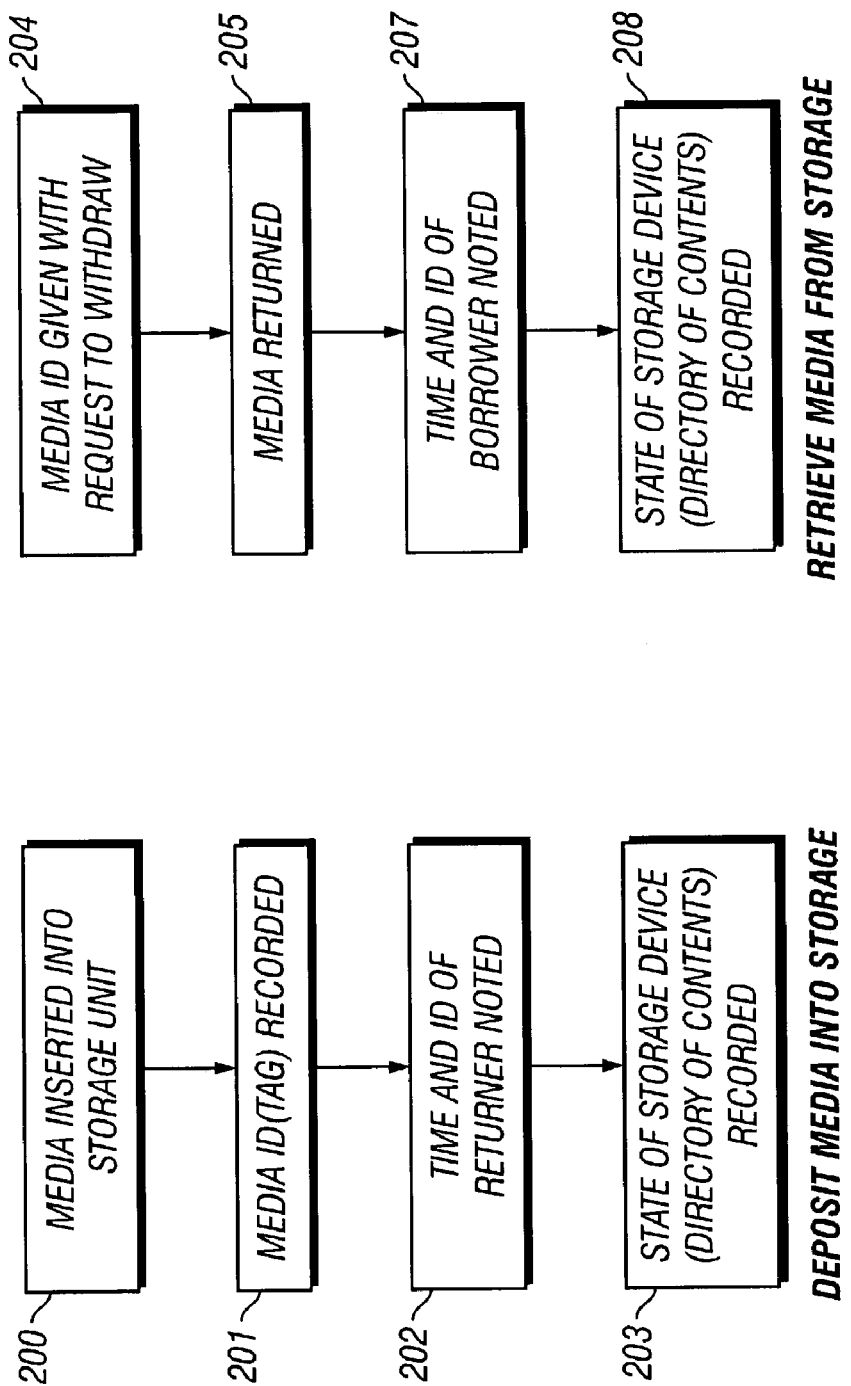
FIG. 9 is a flow chart showing steps for depositing and retrieving removable data storage devices.

FIG. 9 shows the steps involved in the storing and retrieving procedure. As seen in FIG. 9, when depositing a removable data storage device 100 into storage the data storage device is inserted 200 into the storage system 126, the identification code associated with the removable data storage device is recorded 202, the time of deposit and an identification of the user/depositor/returner 203 is stored at the processing device, and the state of the data storage device (directory of the contents) 203 is recorded and stored at the computer system. When retrieving a removable data storage device 100 the identification code for the data storage device 204 is provided by the user along with a withdrawal request, the removable data storage device is returned 205 to an authorized user, the time of retrieval and identification 207 of the borrower/user is logged at the processing device, and the state (directory of the contents) of the data storage device 208 is recorded and stored within the computer system 120.

FIG. 10 illustrates an example directory record from the processing device 122 (CPU or computer) controlling the storage system 126. Through this, administrators will know who the borrowers are and what files they are creating, deleting, and modifying on the handled media. A log of information is maintained at the processing device 122 including information relating to removable data storage devices removed from the computer system, removable data storage devices in use at the computer system, and removable data storage devices stored at the computer system.

It is desired that removable media be tagged and assign identification numbers as soon as they are accepted into an organization's inventory. The identified media may selectively be stored in a blank media storage, which will serve as a media issue system for the organization. Computers in the organization are to be equipped with media ID tag readers. When a media (CD-ROM or disk) is inserted into a drive, its id tag is first read. If a media carries an authorized id number then will it be read. This prevents the use of unauthorized media in connection with the secure information computer systems of an organization.

The instantly proposed use of RFID tags offer non-contact, non-line-of-sight nature of the technology. They possess read/write capability. RFID tags can be also read from significant distances. RFID tag data is also generally not able to be copied through mechanical means, and by using encryption techniques unauthorized replication will be extremely difficult.

Figure 11:
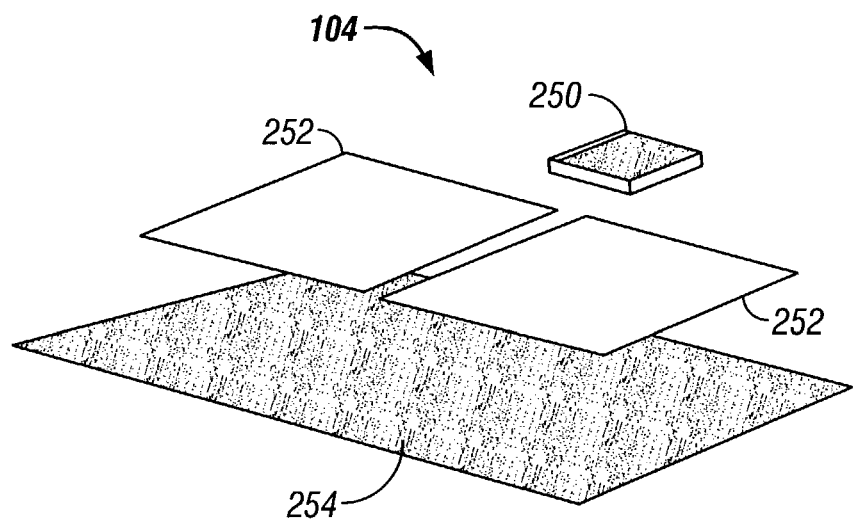
FIG. 11 is an exploded view illustrating an RFID tag.
Figure 12:
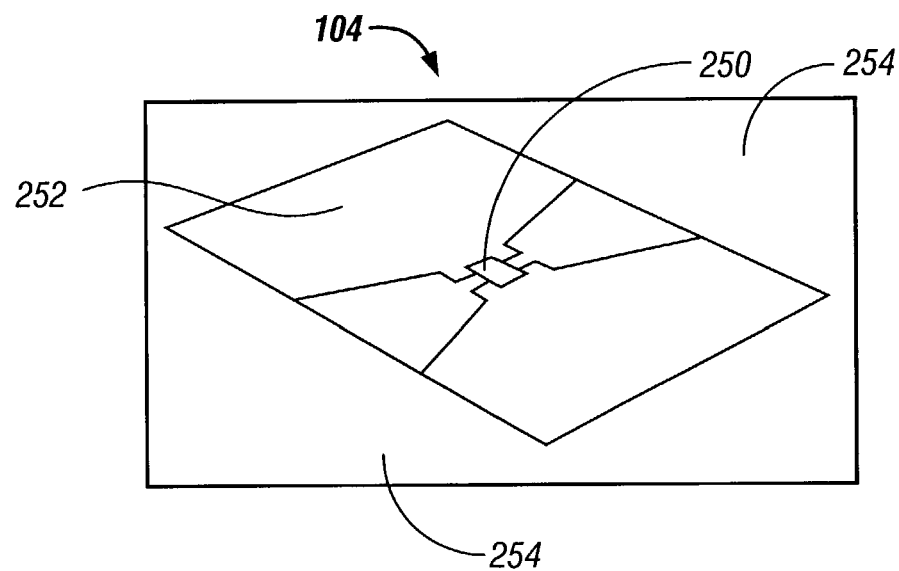
FIG. 12 is illustrative of an RFID tag.

There are several alternative RFID tags, which may selectively be employed. One example of a RFID tag is a Motorola BiStatix™ tag. The exemplary RFID tag 104 shown in FIGS. 11 and 12, works on a capacitive coupling principle, wherein, electric fields are capacitively coupled to and from a reader and tag. The tag consists primarily of a silicon integrated circuit 250 chip connected to carbon ink electrodes 252 printed on a sheet of paper or label 254. As in an inductive system, an RFID reader/writer 110 generates an excitation field, which serves as both the source of power and master clock for the tag. The tag cyclically modulates its data contents and transmits them to a receiver circuit of the reader 110. The reader demodulates and decodes the data signal and provides a formatted data packet to a host computer (such as processing device) for further data processing. Tags are printable by a label converter using standard industry methods. The RFID silicon is attached to the printed material. The tag can be bent, cut, torn and remains functional as long as some remnants of the electrode are connected to the silicon integrated circuit. In terms of tag orientation, inductive tags perform optimally at parallel planes of reader and tag, but monopole-coupled tags (such as BiStatix™ tags) do not have this orientation constraint. They can be applied to any physical configuration, are very flexible, thin, flat, and not limited with regard to the substrate material. The tags may selectively operate at 125 KHz. The integrated circuit of the exemplary tag holds about 800 user bits of data storage/information or about 100 characters worth of information, enough for a title/name, classification, serial number, date/time, or similar information.

Figure 13:
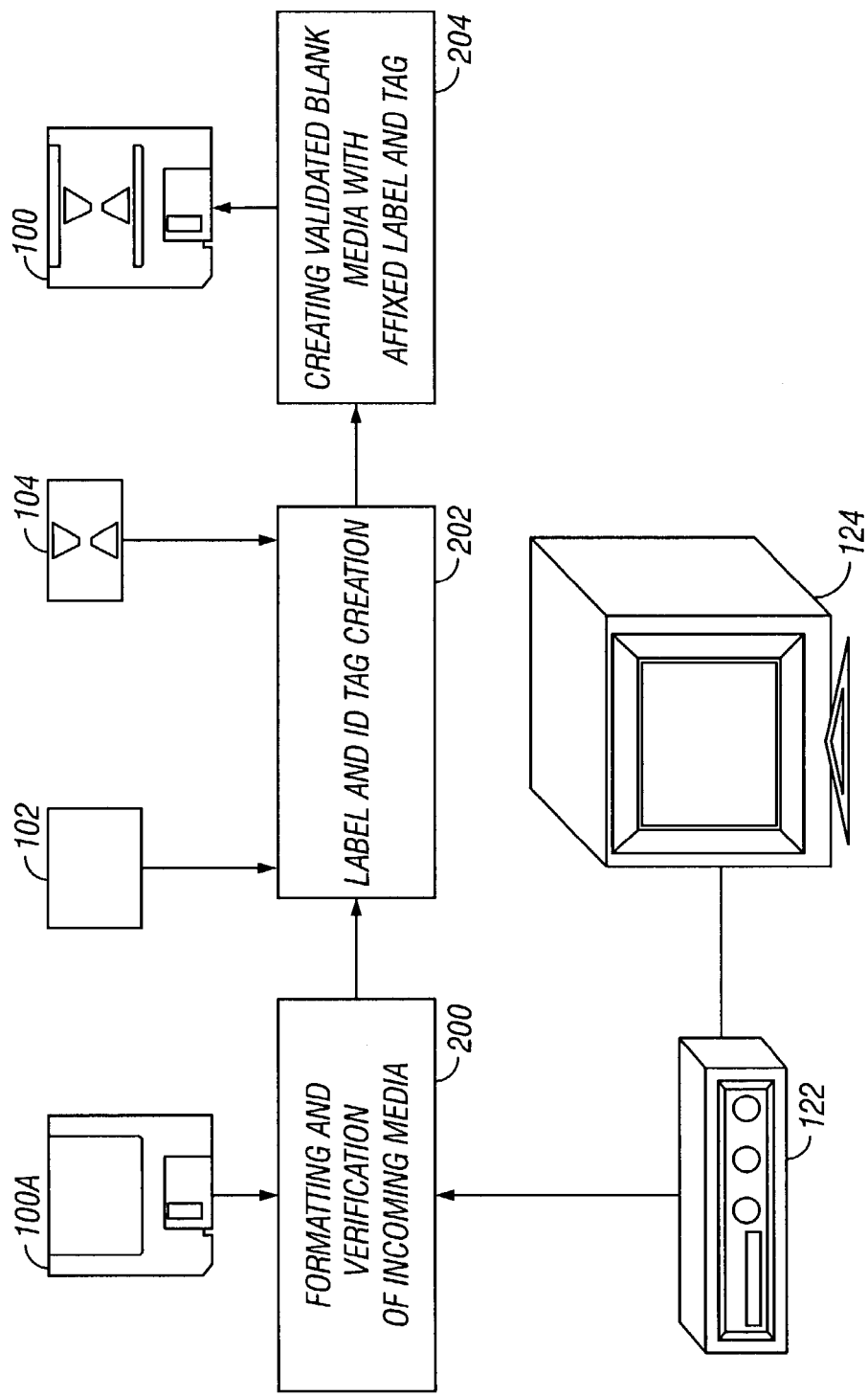
FIG. 13 is illustrative of the steps for one example of verification and tagging of data storage devices.

FIG. 13 shows a schematic arrangement of an exemplary method for the process of verifying and tagging data storage devices. A validating computer system 300 in the organization with CPU 122 and monitor 124 controls and records this validating process. As a first step 200, new removable data storage device (media) 100A is checked for viruses or other files on the media, the media is formatted, and a unique identification number or code (I D) is assigned to it. In step 202, a label 102 and an electronic (or RFID) tag 104 are generated. In process step 204, the label and ID tag are affixed to the media and a validated media 100 is generated. This is now stored in a blank media storage from which media issues are controlled. RFID tags may also be built into the data storage deices during their manufacturing process.

Figure 14:
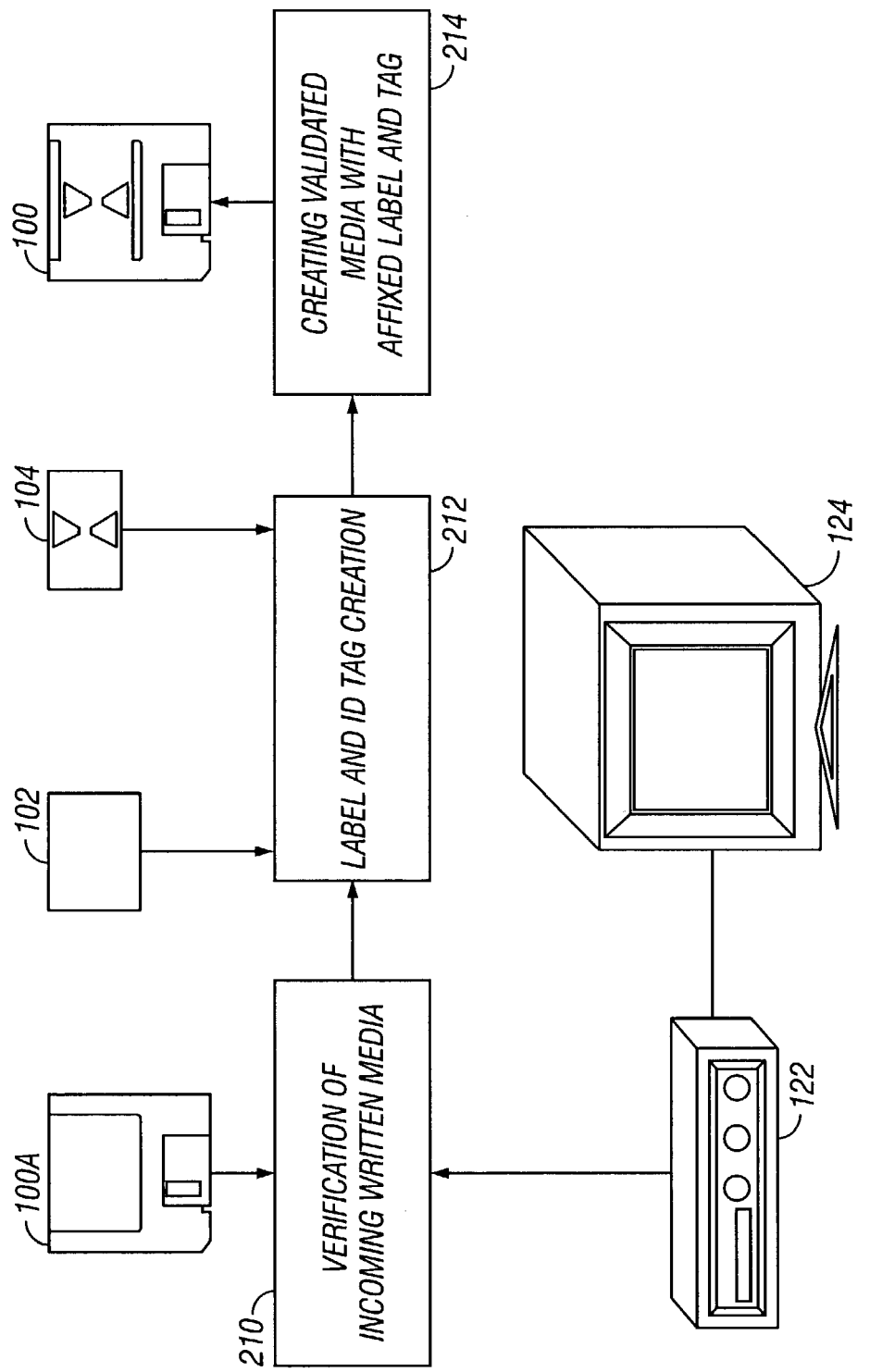
FIG. 14 is illustrative of the steps for another example of verification and tagging of data storage devices.

FIG. 14 shows another validating and verifying computer system 300 having processor 122 and monitor 124 which controls and records removable media coming from other organizations or from within the organization from a non-controlled environment. In step 210 a check is made to ensure that there are no viruses or other problem files on the media 10A. Then in step 212, a label 102 and a tag 104 are generated. In step 214, the label and tag are affixed to the media to generate a validated media 100. This validated media is deposited into the storage system 126 as explained in this description.

Figure 15:
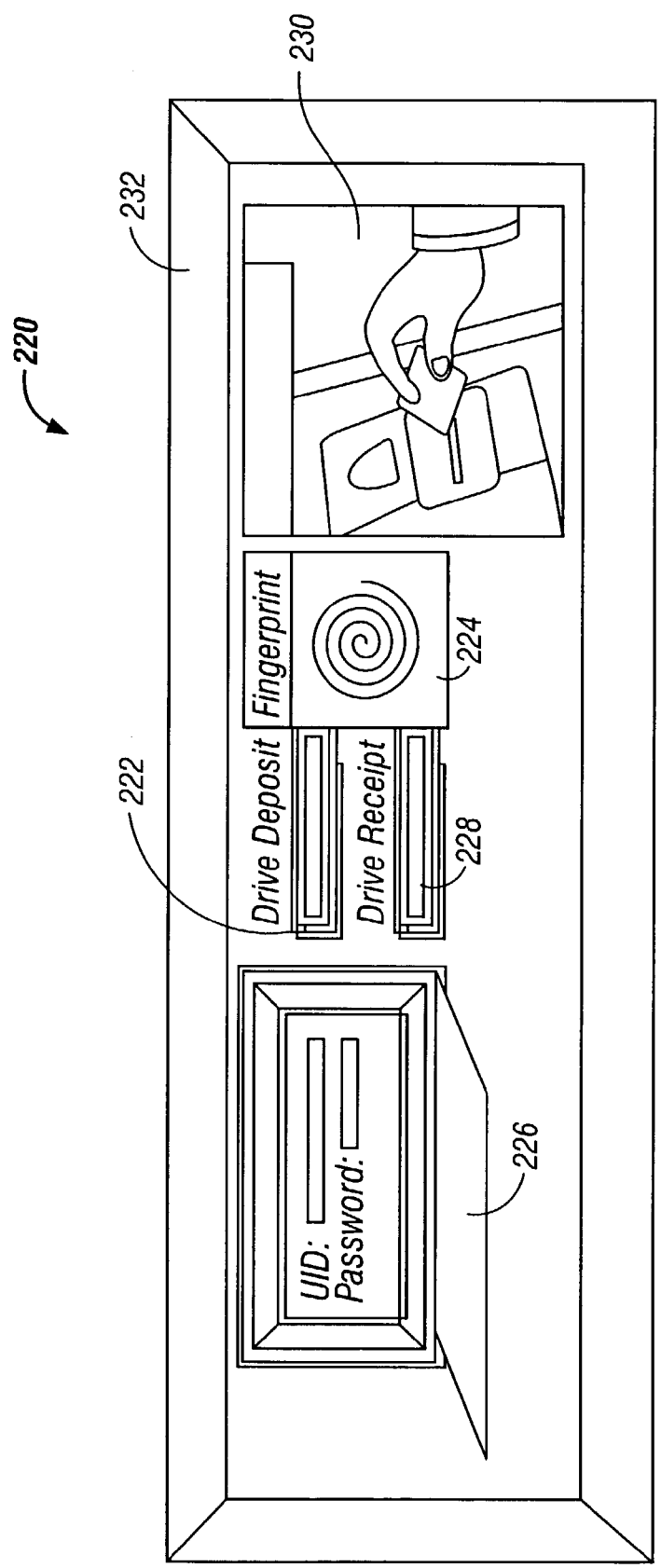
FIG. 15 is illustrative of one example of a user interface for the computer system.

FIG. 15 shows a monitor and console 220 that a user can use for interaction with the system. A data storage device chute 222 that is used with the depositing process is shown. A biometric identification device 224 at the computer system 120 may be used to obtain user information to determine if the user is authorized to access the computer system. An example of a fingerprint identifier is shown. Other biometric system sensors can also be used. A keyboard 226 is used for a user to enter commands. Typically, a user would provide personal identification details and the drive requisitions. A drive chute 228 is used for receiving requested data storage devices. A smart identification card handler 230 is shown. A strong (steel) case 232 houses the system.

The computer system is given directory read access to the stored media by providing a subset operating system software. The system may selectively have no other read, write, or delete access to the contents of the files on the media. The system can keep track of the status of the directory of all files on the media, while also providing user authentication, authorization, and accounting, a protocol that identifies users, authorizes them for access according to their specific profiles, and maintains accountability records to track usage for each user.

Used in conjunction with a "smart card", the RFID tag approach permits contact-less physical access control (accomplished via RFID) to co-exist with contact-oriented applications such as access or authentication to secure areas. When a removable data storage device is connected to the computer system 120, it registers its identity and the time it is connected. The processing device 122 registers when a removable data storage device 100 is checked in and when it is checked out. The computer system also records who checked it in and who checked it out. An organization can quickly have an inventory of its removable media. The computer system keeps track of what files were created, deleted, and modified (in size) during the period the media were borrowed from the repository. This later function provides a database of people who were borrowing the media devices and using them in various ways.

The processing device of the computer system is programmed to provide the following software functionality: recognizing the identity of a removable disk drive that is connected (checked-in); recording the time a removable data storage device that is connected to the system; recognizing the identity of a removable data storage device is disconnected (checked-out); recording the time a removable data storage device is disconnected from the system; recognizing the identity of a person that checked-in a removable data storage device; recognizing the identity of a person that checked-out a removable data storage device; disposition of files on the media at check-out and at check-in. The processing device 122 maintains a log of information associated with the removable data storage device including information relating to the date and time the removable data storage device was inserted and retrieved from the computer system, identification of persons inserting and retrieving the removable data storage device from the computer system, and disposition of files stored at the removable data storage device at insertion and retrieval of the data storage device from the computer system.

In order to recognize persons who check in and check out the removable disks, the system will selectively have biometric user identification device connected to it. Typical devices are fingerprint identification system, face recognition system, signature recognition system, and iris or retina recognition system. Depending on the desired level of security, the use of a "smart card" (such as a Common Access Card (CAC) used by the US Department of Defense (DOD), or log on and password identification can also be used to identify a user of the check-in and checkout system.

The computer system 120 reads the directory of files on the removable data storage device and maintains a log of changes. In an alternative embodiment, the removable media may be protected from being used on a computer system (a PC, a desktop, a lap top, a PDA, or a work station) that is not validated. An RFID reader is provided with each CPU that receives the tagged removable media. Also the tags on the removable media carry a password, which provides access to the contents on the media. In operation, the following steps take place. When a user places the removable media into an authenticated computer system, the user ID and the media tag are read. The system will obtain the password from the tag. The CPU processes the password and allows the user access to the contents on the media. If a user takes the media to an unauthorized or unauthenticated CPU with no ID tag reader, the password required to gain access to the contents on the media is not available. The processing device fails to read the contents of that media. The contents of a tag, a flag to indicate the classification information (Top Secret, Secret, Confidential, FOUO, and Unclassified), may also be added. An authorized ID tag reader reads the classification flag and compared with the access level of the reader. The computer system then allows a specific user to read the contents on the media only if the access level is sufficiently higher for that user to gain access to such information as is available on that media.

The proposed system provides the advantages of tracking computer media, file changes and media users. In the case of high security military and financial systems, the knowledge of file changes and who changed what and when is extremely critical. The use of RFID tags to label media speeds up inventory and accountability. The inventory operation is fast and efficient because the reader scans the external tag as the media is removed or replaced from its slot, greatly reducing the time it takes to locate a media device. RFID technology provides identification of media (or removable data storage devices) and maintains a catalog of what media are in use and which are safely in storage. The software programmed processing device keeps track of borrowers and what they do with the information (files and databases). The benefit of such a system capability is the accountability and tracking of all highly classified media devices. This later function provides a database of people and automated mechanical handlers (robots and software agents) who are borrowing, accessing or using them in various ways. The system identifies each media/device and keeps a catalog of what media are currently connected to it. When a user borrows a removable disk drive, for example, the system keeps a log of the tag identification number of the disk borrowed and the date and time of checkout. When the data storage device is returned, the system keeps a log of when the data storage device is returned and by whom. The storage system can be applied to safekeeping smart cards, PDAs, and cell phones. The system keeps a log of media check-ins and checkouts.

After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

We claim:

1. A method of securely storing data in a computer system comprising the steps of:
providing a removable data storage device to be at least one of: (a) floppy disk, (b) compact disk, (c) digital versatile disk (DVD), (d) tape drive, (e) smart card, (f) personal computer memory card international association (PCMCIA) card, and (g) zip disk, that is able to be inserted and removed from the computer system; and
applying a Radio Frequency Identification Device (RFID) tag to the removable data storage device;
placing the RFID tag with a corresponding label on the removable data storage device;
assigning an identification code to the removable data storage device, and
storing the identification code with the RFID tag attached to the removable data storage device,
reading the identification code when the removable data storage device is inserted into the computer system,
storing the identification code at a processor of the computer system, and
storing directory data from the removable data storage device at the processing device of the computer system; and
retrieving the removable data storage device from a plurality of removable data storage devices of the computer system in response to an authorized user request identifying the identification code for the removable data storage device.

2. The method of claim 1 further comprising transferring the removable data storage device from a storage location to an output location of the computer system, and
reading the identification code with an identification tag reader and reading directory data from the data storage device with a media reader during transfer of the removable data storage device.

3. The method of claim 2 further comprising obtaining user information through the use of a biometric identification device at the computer system to determine if the user is authorized to access the computer system.

4. The method of claim 2 further comprising reading data stored at the removable data storage device, identifying the removable data storage device, and gathering directory information pertaining to the removable data storage device for storage at the processing device in response to the removable data storage device being returned to the computer system.

5. The method of claim 2 further comprising maintaining, at the processing device, a log of information associated with the removable data storage device including a date and time the removable data storage device was inserted and retrieved from the computer system, identification of persons inserting and retrieving the removable data storage device from the computer system, and disposition of files stored at the removable data storage device at insertion and retrieval of the data storage device from the computer system.

6. The method of claim 2 further comprising maintaining a log of information at the processing device including information relating to removable data storage devices removed from the computer system, removable data storage devices in use at the computer system, and removable data storage devices stored at the computer system.

7. The method of claim 2 further comprising permitting the RFID tag to have read/write capabilities,
providing the RFID tag with a silicon integrated circuit connected to carbon ink electrodes printed on a label such that electric fields are capacitively coupled to and from the RFID tag and the identification tag reader.

8. A computer system for securely storing data comprising:
a removable data storage device which is at least one of: (a) floppy disk, (b) compact disk, (c) digital versatile disk (DVD), (d) tape drive, (e) smart card, (f) personal computer memory card international association (PCMCIA) card, and (g) zip disk, that is able to be inserted into and removed from the computer system;
a Radio Frequency Identification Device (RFID) tag applied to the removable data storage device, wherein a silicon integrated circuit of the RFID tag is connected to carbon ink electrodes of the tag such that a storage unit is provided at the RFID tag which has read/write capabilities;
a label associated with the RFID tag, where the label and the RFID tag are together placed on the removable data storage device;
an assigned identification code associated with the removable data storage device stored at the storage unit of the RFID tag, where a processing device of the computer system stores the identification code associated with the removable data storage device;
an identification tag reader that reads the identification code when the removable data storage device is inserted into and removed from the computer system,
a media reader that reads directory data from the removable data storage device when the removable data storage device is inserted into and removed from the computer system, said identification tag reader and media reader being coupled to the processing device to transfer the identification code and directory data to the processing device upon being read; and
a plurality of removable data storage devices at the computer system in which the removable data storage device is able to be retrieved in response to an authorized user request identifying the identification code for the removable data storage device.

9. The computer system of claim 8 further comprising a first storage device holder which holds at least one removable data storage device that is received or removed from the computer system,
a second storage device holder which stores at lease one removable data storage device at the computer system, and
a transportation device which transfers removable data storage devices between the first storage device holder and the second storage device holder such that the identification tag reader reads the identification code and the media reader reads the directory data during transfer at the removable data storage device between the first storage device holder and the second storage device holder.

10. The computer system of claim 9 further comprising a biometric identification device coupled with the processing unit to determine if the user is authorized to access the computer system.

11. The computer system of claim 9 further comprising a log of information stored at the processing device including information relating to a date and time the removable data storage device was inserted and retrieved from the computer system, identification of persons inserting and retrieving the removable data storage device from the computer system and disposition of files stored at the removable data storage device at insertion and retrieval of the data storage device from the computer system.

12. The computer system of claim 9 further comprising a log of information stored at the processing device including information relating to identification of removable data storage devices removed from the computer system, removable data storage devices in use at the computer system, and removable data storage devices stored at the computer system.

13. A computer system for securely storing data comprising:
a removable data storage device which is capable of being inserted into and removed from the computer system;
a Radio Frequency Identification Device (RFID) tag applied to the removable data storage device, wherein a storage unit is provided at the RFID tag which has read/write capabilities;
an assigned identification code associated with the removable data storage device and stored at the storage unit of the RFID tag, where a processing device of the computer system stores the identification code associated with the removable data storage device;
an identification tag reader that reads the identification code when the removable data storage device is inserted into and removed form the computer system; and
a media reader that reads directory data from the removable data storage device when the removable data storage device is inserted into and removed from the computer system, wherein the identification tag reader and the media reader being coupled to the processing device to transfer the identification code and directory data to the processing device upon being read, and wherein a plurality of removable data storage devices at the computer system are able to be retrieved in response to an authorized user request identifying the identification code for the removable data storage device.

14. The computer system of claim 13, wherein the removable data storage device is at least one of: (a) floppy disk, (b) compact disk, (c) digital versatile disk (DVD), (d) tape drive, (e) smart card, (f) personal computer memory card international association (PCMCIA) card, and (g) zip disk.

* * * * *